US012410714B2

(12) United States Patent
Duong

(10) Patent No.: US 12,410,714 B2
(45) Date of Patent: Sep. 9, 2025

(54) AIRFOIL THICKNESS PROFILE FOR MINIMIZING TIP LEAKAGE FLOW

(71) Applicant: Pratt & Whitney Canada Corp., Longueuil (CA)

(72) Inventor: Hien Duong, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/341,220

(22) Filed: Jun. 26, 2023

(65) Prior Publication Data

US 2024/0426218 A1 Dec. 26, 2024

(51) Int. Cl.
*F01D 5/14* (2006.01)
*F01D 5/20* (2006.01)

(52) U.S. Cl.
CPC ............... *F01D 5/141* (2013.01); *F01D 5/20* (2013.01); *F05D 2240/24* (2013.01)

(58) Field of Classification Search
CPC . F01D 5/141; F01D 5/148; F01D 5/20; F01D 11/08; F05D 2240/305–307; F05D 2250/711; F05D 2250/73; F05D 2250/74
See application file for complete search history.

(56) References Cited

U.S. PATENT DOCUMENTS 5,395,071 A * 3/1995 Felix .......................... B64C 3/14 244/35 R
6,565,324 B1 * 5/2003 Phillipsen ................. F01D 5/20 416/228
6,905,309 B2 * 6/2005 Nussbaum ................ F01D 5/16 29/889.1
8,206,108 B2 6/2012 Riahi et al.
8,393,872 B2 3/2013 Kirtley
(Continued)

FOREIGN PATENT DOCUMENTS

CN 110287647 A 9/2019
CN 112069630 B 1/2021
(Continued)

OTHER PUBLICATIONS

Title Aerodynamics for Engineering Students; Authors Steven H. Collicott, Daniel T. Valentine, E. L. Houghton, P. W. Carpenter Edition 6, revised; Publisher Elsevier, 2012; pp. 25-27 (Year: 2012).*

(Continued)

*Primary Examiner* — Brian P Wolcott

(74) *Attorney, Agent, or Firm* — Carlson, Gaskey & Olds, P.C.

(57) ABSTRACT

A turbine engine assembly includes at least one rotor that has a plurality of blades, each of the blades includes an airfoil that has a pressure side and a suction side that each extend between a leading edge, a trailing edge, a tip and a base. The airfoil has a thickness between the pressure side and the suction side perpendicular to a camber line that varies between the leading edge and the trailing edge. The thickness includes a suction side thickness between the camber line and the suction side and a pressure side thickness between the camber line and the pressure side. A maximum ratio of the pressure side thickness to the suction side thickness is between 3 and 7.

20 Claims, 3 Drawing Sheets

(56) References Cited

U.S. PATENT DOCUMENTS

| | | | | |
|---|---|---|---|---|
| 9,011,081 | B2 * | 4/2015 | Gomez | F01D 17/162 415/151 |
| 9,879,539 | B2 * | 1/2018 | Lentz | F01D 5/16 |
| 10,001,014 | B2 | 6/2018 | Honkomp et al. | |
| 10,006,297 | B2 * | 6/2018 | Yoshida | F01D 25/24 |
| 10,458,427 | B2 * | 10/2019 | McGill | F04D 29/544 |
| 11,274,558 | B2 | 3/2022 | Bruni et al. | |
| 11,371,359 | B2 | 6/2022 | Lecuyer et al. | |
| 2011/0097210 | A1 | 4/2011 | Kirtley | |
| 2015/0104296 | A1 | 4/2015 | Yokoyama et al. | |
| 2016/0024930 | A1 * | 1/2016 | Aaron | F01D 5/16 29/889.7 |

FOREIGN PATENT DOCUMENTS

| | | | |
|---|---|---|---|
| DE | 102012021400 | A1 | 4/2014 |
| EP | 2987956 | A1 | 2/2016 |

OTHER PUBLICATIONS

Extended European Search Report for European Application No. 24184290.5 mailed Nov. 27, 2024.

* cited by examiner

AIRFOIL THICKNESS PROFILE FOR MINIMIZING TIP LEAKAGE FLOW

TECHNICAL FIELD

The present disclosure relates generally to a rotating airfoil utilized in a turbine engine. More particularly, this disclosure relates to an airfoil for reducing leakage flow between a tip of the rotating airfoil and a static structure.

BACKGROUND

A gas turbine engine typically includes a fan section, a compressor section, a combustor section and a turbine section. The compressor and turbine sections include rotating blades within a case structure. A clearance between tips of the rotating blades and the case structure is a source of leakage flow that decreases engine efficiency. Leakage flow is driven by a pressure differential across the tip. The clearance between tips of the rotating blades can be minimized but some minimal clearance is required to accommodate relative movement during operation. Moreover, the rotating blades are sized with a minimum thickness for durability and to provide desired airflow characteristics. Blade efficiency is improved by reducing leakage flow.

SUMMARY

A turbine engine assembly according to an exemplary embodiment of this disclosure, among other possible things includes at least one rotor that has a plurality of blades, each of the blades includes an airfoil that has a pressure side and a suction side that each extend between a leading edge, a trailing edge, a tip and a base. The airfoil has a thickness between the pressure side and the suction side perpendicular to a camber line that varies between the leading edge and the trailing edge. The thickness includes a suction side thickness between the camber line and the suction side and a pressure side thickness between the camber line and the pressure side. A maximum ratio of the pressure side thickness to the suction side thickness is between 3 and 7.

A blade for compressor section of a turbine engine assembly according to another exemplary embodiment of this disclosure, among other possible things includes an airfoil that has a pressure side and a suction side that each extend between a leading edge, a trailing edge, a tip and a base. The airfoil has a thickness between the pressure side and the suction side perpendicular to a camber line that varies between the leading edge and the trailing edge. The thickness includes a suction side thickness between the camber line and the suction side and a pressure side thickness between the camber line and the pressure side. A maximum ratio of the pressure side thickness to the suction side thickness is between 3 and 7.

A method of forming a blade utilized in a turbine engine assembly, the method, according to another exemplary embodiment of this disclosure, among other possible things includes forming an airfoil of the blade assembly to include a thickness between pressure side and a suction side that is perpendicular to a camber line that includes a suction side thickness between the camber line and the suction side and a pressure side thickness between the camber line and the pressure side such that a maximum ratio of the pressure side thickness to the suction side thickness is between 3 and 7.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
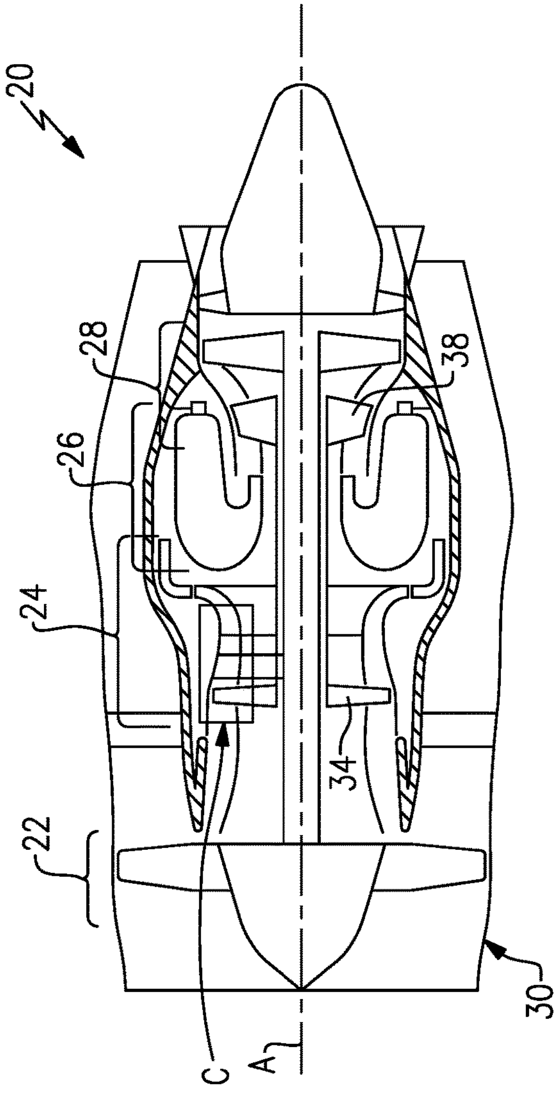
FIG. 1 is a schematic view of an example gas turbine engine.

FIG. 1 schematically illustrates a gas turbine engine 20. The disclosed gas turbine engine 20 includes airfoils with a defined thickness profile that provides a reduction in a pressure difference across an airfoil tip between pressure and suction sides of the airfoil. The airfoil thickness profile is asymmetric about a line of curvature 56 (FIG. 4) that minimizes the pressure difference across the tip. The line of curvature defines a curvature of an airfoil, similar to a camber line, but with differing thickness on each of the pressure side and suction side. Reduction in the pressure difference across the airfoil tip between the pressure and suction sides of the airfoil provides a reduction in leakage flows.

The example gas turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The compressor section 24 drives air along a core flow path C into the compressor section 24 for compression and communication into the combustor section 26. In the combustor section 26, the compressed air is mixed with fuel from a fuel system 32 and burnt to generate an exhaust gas flow that expands through the turbine section 28 to generate mechanical power utilized to drive the fan section 22 and the compressor section 26.

Although depicted as a turbofan turbine engine in the disclosed non-limiting embodiment, it should be understood that the concepts described herein are not limited to use with turbofans as the teachings may be applied to other types of gas turbine engines.

The compressor section 24 includes at least one compressor rotor 34 and the turbine section 26 includes at least one turbine rotor 38. The rotors 34, 38 includes blades that rotate relative to a fixed case structure. Leakage flows between tips of the blades reduces engine efficiency. Some clearance is required to accommodate relative movement during operation and therefore limits reduction in physical clearance between blade tips and a fixed case structure. Example airfoil embodiments according to this disclosure include a defined thickness profile that reduces pressure differentials across tips of the blades that reduce leakage flows while enabling minimum clearances.

Figure 3:
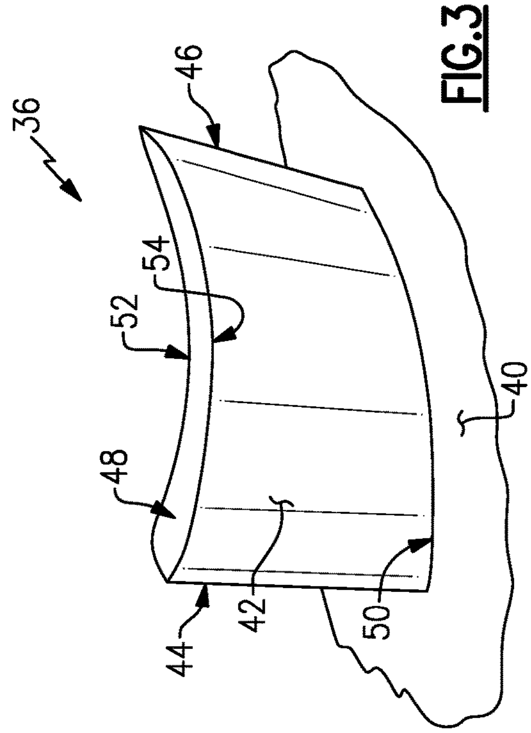
FIG. 3 is a schematic view of an example blade embodiment.
Figure 2:
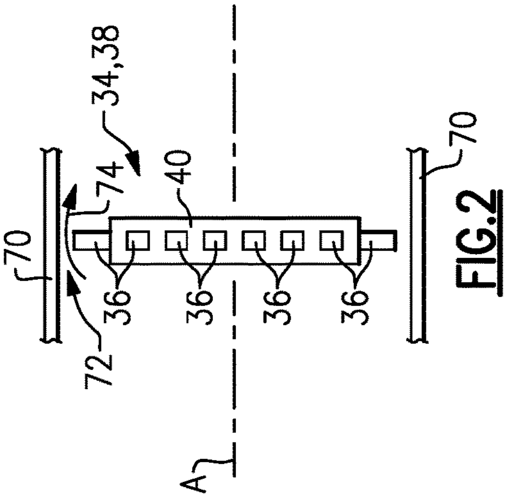
FIG. 2 is a schematic view of an example rotor embodiment.

Referring to FIGS. 2 and 3 with continued reference to FIG. 1, the rotors 34, 38 are shown schematically and include a plurality of blades 36 supported on a hub structure 40. The example blades 36 may be compressor blades or turbine blades and are shown schematically by way of example. The blades 36 rotate relative to a fixed case structure that is shown schematically at 70. A leakage flow 74 moves through a clearance gap 72 between a tip of the blade 36 and the case structure 70.

Each of the blades 36 include an airfoil 42 with a pressure side 52 and a suction side 54. Each side of the airfoil 42 extends between a leading edge 44, a trailing edge 46, a base 50 and a tip 48.

Figure 4:
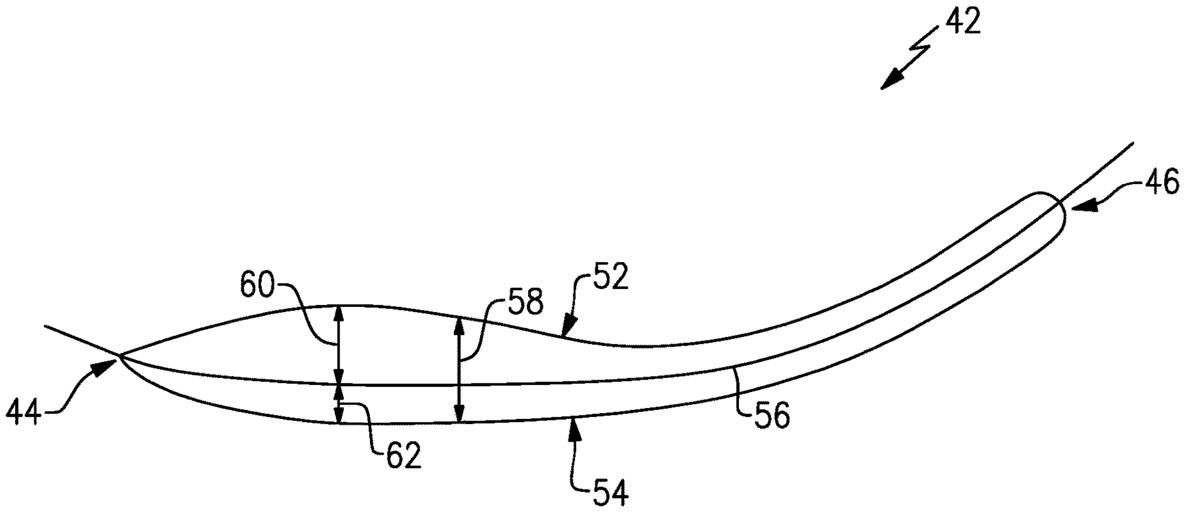
FIG. 4 is a schematic cross-sectional view of an example airfoil embodiment.

Referring to FIG. 4 with continued reference to FIGS. 2 and 3, a cross-section of an example airfoil 36 is shown and illustrates a line of curvature 56 that extends from the leading edge 44 to the trailing edge 46. The airfoil 42 has a thickness 58 that is measured perpendicular to the line of curvature 56. The thickness 58 between the pressure side 52 and the suction side 54 varies along the line of curvature 56 between the leading edge 44 and the trailing edge 46.

The thickness 58 is a total thickness across the airfoil 42 and is formed from a pressure side thickness 60 and a suction side thickness 62. The pressure side thickness 60 is disposed perpendicular to line of curvature 56 between the line of curvature 56 and the pressure side 52. The suction side thickness 62 is disposed perpendicular to the line of curvature 56 between the line of curvature 56 and the suction side 54.

The example airfoil 42 includes a thickness profile along the line of curvature 56 where the pressure side thickness 60 is greater than the suction side thickness 62. The larger pressure side thickness 60 provides for a bias of the airfoil thickness 58 toward the pressure side 52. The biased thickness toward the pressure side 52 generates a bump that provides localized increases in flow velocity that reduce pressure on the pressure side 52. Reducing pressure on the pressure side 52 provides a reduction in the pressure differential between the pressure side 52 and the suction side 54. The reduced pressure difference provides a reduction in leakage flow 74 without changing the clearance gap 72.

Figure 5:
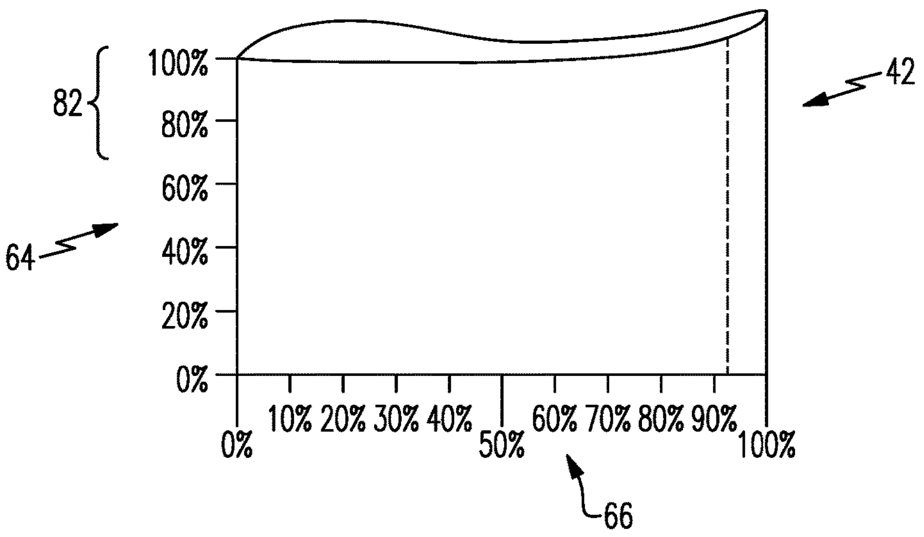
FIG. 5 is a schematic view of an example airfoil embodiment.
Figure 6:
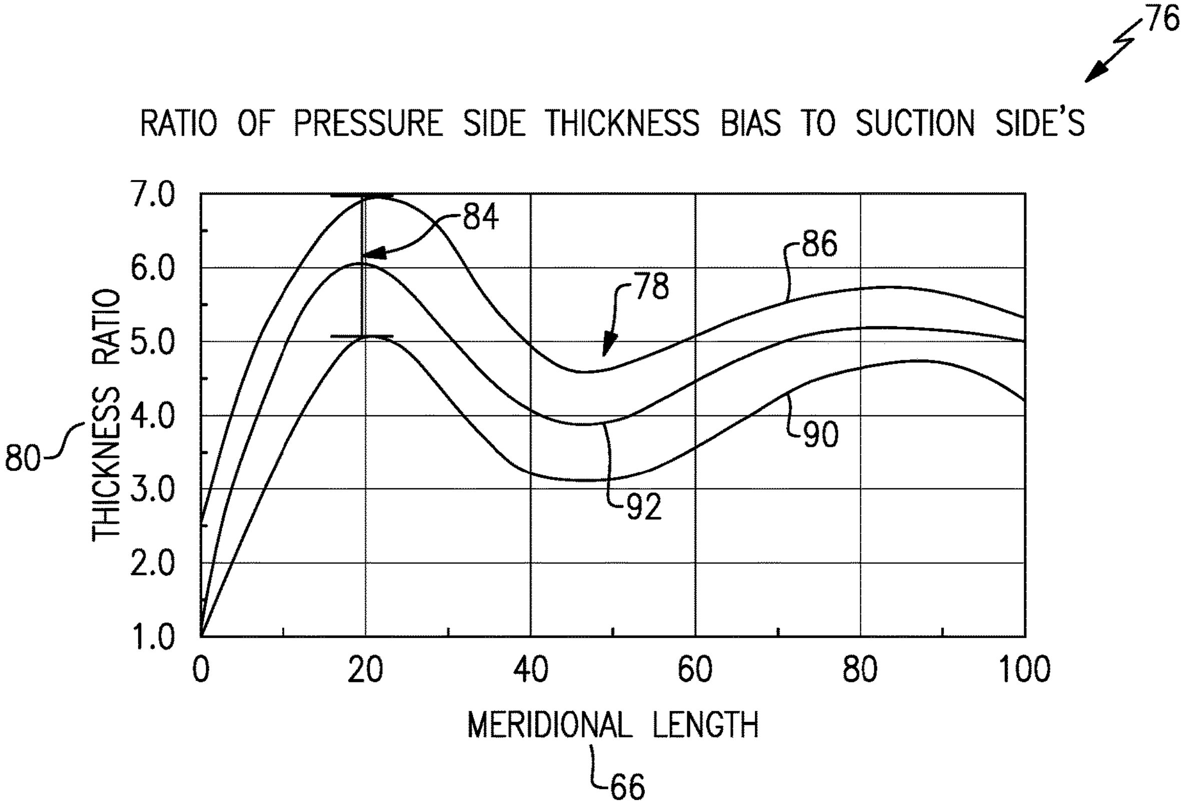
FIG. 6 is a graph illustrating an example thickness ratio profile of an example airfoil embodiment.

Referring to FIGS. 5 and 6 with continued reference to FIG. 4, an example airfoil 42 embodiment includes a thickness profile 78 defined as a thickness ratio 80 between the pressure side thickness 60 and the suction side thickness 62 as shown in the graph 76 of FIG. 6.

In one example embodiment, the example thickness profile 78 is disposed along the airfoil within a tip region 82 as schematically shown in FIG. 5. In one example embodiment, the tip region 82 is disposed between 80% and 100% of the airfoil height 64. Although the example thickness profile 78 is disclosed as being located within the tip region 82, the thickness profile 78 may be located throughout the airfoil height 64 and remain within the contemplation of this disclosure.

The thickness profile 78 illustrates variations in the ratio of the pressure side thickness 60 to the suction side thickness 62 for locations along the meridional length 66. In one example embodiment, the thickness ratio 80 of the pressure side thickness 62 to the suction side thickness is greatest within the meridional length 66 between 5% and 40%. In another example embodiment, the thickness ratio 80 is greatest within a meridional length between 10% and 30%. In another disclosed example embodiment, the thickness ratio 80 is greatest between 15% and 25% of the meridional length 66. In another disclosed example embodiment, the thickness ratio 80 is greatest at 20% of the meridional length 66.

The thickness ratio 80 reflects the increase in the pressure side thickness 60 compared to the suction side thickness 62. The example thickness profile 78 is shown with upper and lower limits 86, 90 centered along a mean thickness ratio 92. In one example embodiment, the thickness ratio 80 varies between 3 and 7 along the meridional length 66. In another example embodiment, a maximum thickness ratio 84 is between 5 and 7. In other words, the pressure side thickness 60 is between 5 and 7 times larger than the suction side thickness 62. In another example embodiment, the maximum thickness ratio 84 is 6.

The example thickness ratio 80 may vary along the meridional length 66 but maintains the overall thickness 58. Maintaining the overall thickness 58 does not change the physical properties of the airfoil 42 and thereby maintains the defined mechanical structural properties. Because the airfoils thickness 58 remains unchanged, airfoils structural integrity is not compromised nor changed. Moreover, maintaining the same overall thickness 58 of the airfoil 42 has minimal impact on cost and/or manufacture.

A turbine engine assembly 20 according to an exemplary embodiment of this disclosure, among other possible things includes at least one rotor that has a plurality of blades 36, each of the blades 36 includes an airfoil 42 that has a pressure side 52 and a suction side 54 that each extend between a leading edge 44, a trailing edge 46, a tip 48 and a base 50. The airfoil 42 has a thickness between the pressure side 52 and the suction side 54 perpendicular to a line of curvature 56 that varies between the leading edge 44 and the trailing edge 46. The thickness includes a suction side thickness 62 between the line of curvature 56 and the suction side 54 and a pressure side thickness 60 between the line of curvature 56 and the pressure side 52. A maximum ratio of the pressure side thickness 60 to the suction side thickness 62 is between 3 and 7.

In a further embodiment of the foregoing turbine engine assembly, the maximum ratio of the pressure side thickness 60 to the suction side thickness 62 is disposed between 80% and 100% of a height of the airfoil 42 between the base 50 and the tip portion.

In a further embodiment of any of the foregoing turbine engine assemblies, the maximum ratio of the pressure side thickness 60 to the suction side thickness 62 is at a location between 5% and 40% of a meridional length 66 between the leading edge 44 and the trailing edge 46.

In a further embodiment of any of the foregoing turbine engine assemblies, the maximum ratio of the pressure side thickness 60 to the suction side thickness 62 is at a location between 10% and 30% of a meridional length 66 between the leading edge 44 and the trailing edge 46.

In a further embodiment of any of the foregoing turbine engine assemblies, the maximum ratio of the pressure side thickness 60 to the suction side thickness 62 is between 5 and 7.

In a further embodiment of any of the foregoing turbine engine assemblies, the maximum ratio of the pressure side thickness 60 to the suction side thickness 62 is 6.

In a further embodiment of any of the foregoing turbine engine assemblies, the maximum ratio of the pressure side thickness 60 to the suction side thickness 62 is at a location that is between 15% and 25% of the meridional length 66 between the leading edge 44 and the trailing edge 46.

In a further embodiment of any of the foregoing turbine engine assemblies, the at least one rotor includes a compressor rotor 34.

In a further embodiment of any of the foregoing turbine engine assemblies, the at least one rotor includes a turbine rotor 38.

A blade 36 for compressor section of a turbine engine assembly according to another exemplary embodiment of this disclosure, among other possible things includes an airfoil 42 that has a pressure side 52 and a suction side 54 that each extend between a leading edge 44, a trailing edge 46, a tip 48 and a base 50. The airfoil 42 has a thickness between the pressure side 52 and the suction side 54 perpendicular to a line of curvature 56 that varies between the leading edge 44 and the trailing edge 46. The thickness includes a suction side thickness 62 between the line of curvature 56 and the suction side 54 and a pressure side thickness 60 between the line of curvature 56 and the pressure side 52. A maximum ratio of the pressure side thickness 60 to the suction side thickness 62 is between 3 and 7.

In a further embodiment of the foregoing blade, the ratio of the pressure side thickness 60 to the suction side thickness 62 is disposed between 80% and 100% of a height of the airfoil 42 between the base 50 and the tip portion.

In a further embodiment of any of the foregoing blades, the maximum ratio of the pressure side thickness 60 to the suction side thickness 62 is at a location between 5% and 40% of a meridional length 66 between the leading edge 44 and the trailing edge 46.

In a further embodiment of any of the foregoing blades, the maximum ratio of the pressure side thickness 60 to the suction side thickness 62 is at a location between 10% and 30% of a meridional length 66 between the leading edge 44 and the trailing edge 46.

In a further embodiment of any of the foregoing blades, the maximum ratio of the pressure side thickness 60 to the suction side thickness 62 is between 5 and 7.

In a further embodiment of any of the foregoing blades, the maximum ratio of the pressure side thickness 60 to the suction side thickness 62 is 6.

In a further embodiment of any of the foregoing blades, the maximum ratio of the pressure side thickness 60 to the suction side thickness 62 is at a location that is between 15% and 25% of the meridional length 66 between the leading edge 44 and the trailing edge 46.

A method of forming a blade utilized in a turbine engine assembly, the method, according to another exemplary embodiment of this disclosure, among other possible things includes forming an airfoil 42 of the blade assembly to include a thickness between pressure side 52 and a suction side 54 that is perpendicular to a line of curvature 56 that includes a suction side thickness 62 between the line of curvature 56 and the suction side 54 and a pressure side thickness 60 between the line of curvature 56 and the pressure side 52 such that a maximum ratio of the pressure side thickness 60 to the suction side thickness 62 is between 3 and 7.

In a further embodiment of the foregoing, the method further includes locating the maximum ratio of the pressure side thickness 60 to the suction side 54 thickness within a location between 80% and 100% of a height of the airfoil 42 between a base 50 and a tip portion.

In a further embodiment of any of the foregoing, the method further includes locating the maximum ratio of the pressure side thickness 60 to the suction side thickness 62 within a location between 5% and 40% of a meridional length 66 between a leading edge 44 and a trailing edge 46.

In a further embodiment of any of the foregoing methods, the maximum ratio of the pressure side thickness 60 to the suction side thickness 62 is between 5 and 7 and is within a location between 15% and 25% of the meridional length 66 between a leading edge 44 and a trailing edge 46.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising:

at least one rotor having a plurality of blades, wherein each blade includes;

an airfoil having;

a pressure side and a suction side that each extend between a leading edge, a trailing edge, a tip, and a base; and a thickness between the pressure side and the suction side perpendicular to a line of curvature that defines a curvature of the airfoil, wherein the thickness varies between the leading edge and the trailing edge, wherein the thickness comprises a suction side thickness between the line of curvature and the suction side and a pressure side thickness between the line of curvature and the pressure side, wherein a ratio of the pressure side thickness to the suction side thickness continually increases from the leading edge toward a maximum ratio of the pressure side thickness to the suction side thickness and the maximum ratio of the pressure side thickness to the suction side thickness is between 3 and 7.

2. The turbine engine assembly as recited in claim 1, wherein the maximum ratio of the pressure side thickness to the suction side thickness is disposed between 80% and 100% of a height of the airfoil between the base and the tip.

3. The turbine engine assembly as recited in claim 2, wherein the maximum ratio of the pressure side thickness to the suction side thickness is at a location between 5% and 40% of a meridional length between the leading edge and the trailing edge.

4. The turbine engine assembly as recited in claim 2, wherein the maximum ratio of the pressure side thickness to the suction side thickness is at a location between 10% and 30% of a meridional length between the leading edge and the trailing edge.

5. The turbine engine assembly as recited in claim 1, wherein the maximum ratio of the pressure side thickness to the suction side thickness is between 5 and 7.

6. The turbine engine assembly as recited in claim 3, wherein the maximum ratio of the pressure side thickness to the suction side thickness is 6.

7. The turbine engine assembly as recited in claim 6, wherein the maximum ratio of the pressure side thickness to the suction side thickness is at a location that is between 15% and 25% of the meridional length between the leading edge and the trailing edge.

8. The turbine engine assembly as recited in claim 1, wherein the at least one rotor comprises a compressor rotor.

9. The turbine engine assembly as recited in claim 1, wherein the at least one rotor comprises a turbine rotor.

10. A blade for compressor section of a turbine engine assembly comprising:

an airfoil having a pressure side and a suction side that each extend between a leading edge, a trailing edge, a tip and a base, the airfoil having a thickness between the pressure side and the suction side perpendicular to a line of curvature that defines a curvature of the airfoil, wherein the thickness that varies between the leading edge and the trailing edge, wherein the thickness comprises a suction side thickness between the line of curvature and the suction side and a pressure side thickness between the line of curvature and the pressure side, wherein a ratio of the pressure side thickness to the suction side thickness continually increases from the leading edge toward a maximum ratio of the pressure side thickness to the suction side thickness and the maximum ratio of the pressure side thickness to the suction side thickness is between 3 and 7.

11. The blade as recited in claim 10, wherein the ratio of the pressure side thickness to the suction side thickness is disposed between 80% and 100% of a height of the airfoil between the base and the tip.

12. The blade as recited in claim 11, wherein the maximum ratio of the pressure side thickness to the suction side thickness is at a location between 5% and 40% of a meridional length between the leading edge and the trailing edge.

13. The blade as recited in claim 11, wherein the maximum ratio of the pressure side thickness to the suction side thickness is at a location between 10% and 30% of a meridional length between the leading edge and the trailing edge.

14. The blade as recited in claim 10, wherein the maximum ratio of the pressure side thickness to the suction side thickness is between 5 and 7.

15. The blade as recited in claim 10, wherein the maximum ratio of the pressure side thickness to the suction side thickness is 6.

16. The blade as recited in claim 15, wherein the maximum ratio of the pressure side thickness to the suction side thickness is at a location that is between 15% and 25% of the meridional length between the leading edge and the trailing edge.

17. A method of forming a blade utilized in a turbine engine assembly, the method comprising:

forming an airfoil of the blade to include a thickness between a pressure side and a suction side that is perpendicular to a line of curvature that defines a curvature of the airfoil, wherein the thickness includes a suction side thickness between the line of curvature and the suction side and a pressure side thickness between the line of curvature and the pressure side such that a ratio of the pressure side thickness to the suction side thickness continually increases from the leading edge toward a maximum ratio of the pressure side thickness to the suction side thickness and the maximum ratio of the pressure side thickness to the suction side thickness is between 3 and 7.

18. The method as recited in claim 17, further comprising locating the maximum ratio of the pressure side thickness to the suction side thickness within a location between 80% and 100% of a height of the airfoil between a base and a tip portion.

19. The method as recited in claim 18, further comprising locating the maximum ratio of the pressure side thickness to the suction side thickness within a location between 5% and 40% of a meridional length between a leading edge and a trailing edge.

20. The method as recited in claim 18, wherein the maximum ratio of the pressure side thickness to the suction side thickness is between 5 and 7 and is within a location between 15% and 25% of the meridional length between a leading edge and a trailing edge.

* * * * *